H. R. KELLEY.
SELF PROPELLED VEHICLE.
APPLICATION FILED OCT. 13, 1913.

1,223,495.

Patented Apr. 24, 1917.
2 SHEETS—SHEET 1.

Witnesses
F. C. Caswell
F. M. Hardy

Inventor
Harry Richmond Kelley
by John E. Stryker atty

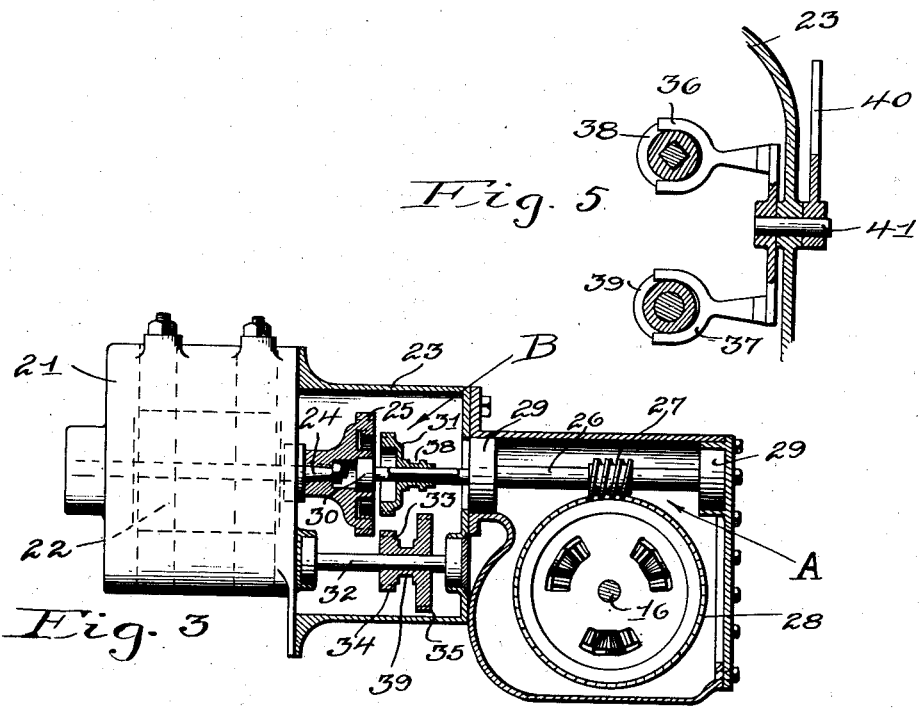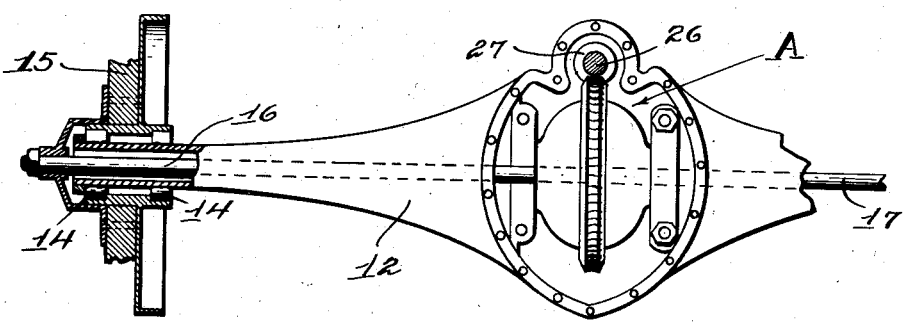

UNITED STATES PATENT OFFICE.

HARRY RICHMOND KELLEY, OF MINNEAPOLIS, MINNESOTA, ASSIGNOR OF ONE-HALF TO PURITY BAKING COMPANY, OF ST. PAUL, MINNESOTA, A CORPORATION OF MINNESOTA.

SELF-PROPELLED VEHICLE.

1,223,495.

Specification of Letters Patent. Patented Apr. 24, 1917.

Application filed October 13, 1913. Serial No. 794,844.

*To all whom it may concern:*

Be it known that I, HARRY RICHMOND KELLEY, a citizen of the United States, residing at Minneapolis, in the county of Hennepin and State of Minnesota, have invented new and useful Improvements in Self-Propelled Vehicles, of which the following is a specification.

My invention relates to improvements in self-propelled vehicles.

Its object is to unite the driving mechanism and rear axle in one floating structure and to provide a simple, durable and efficient self-propelled vehicle.

Figure 1:
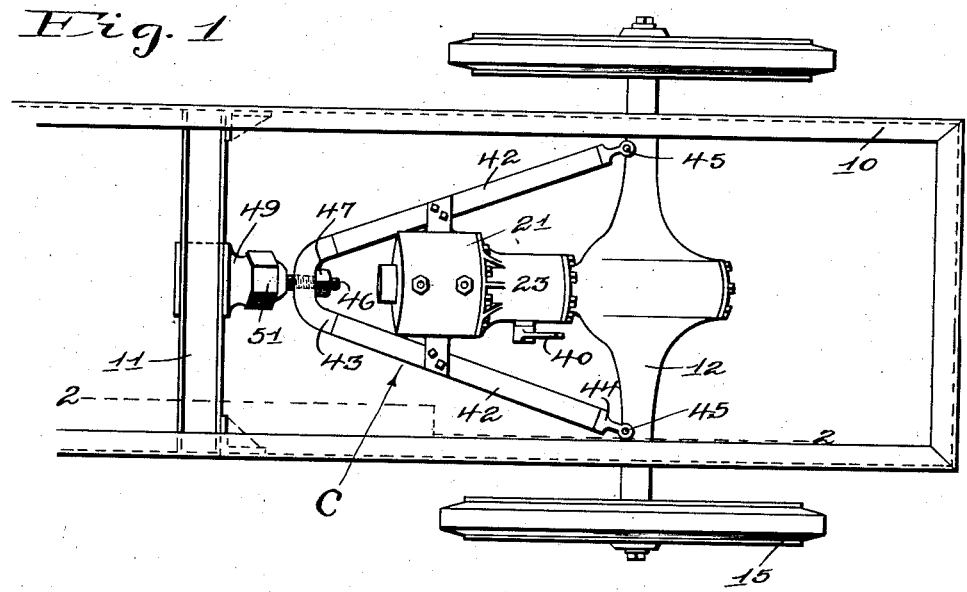
Figure 2:
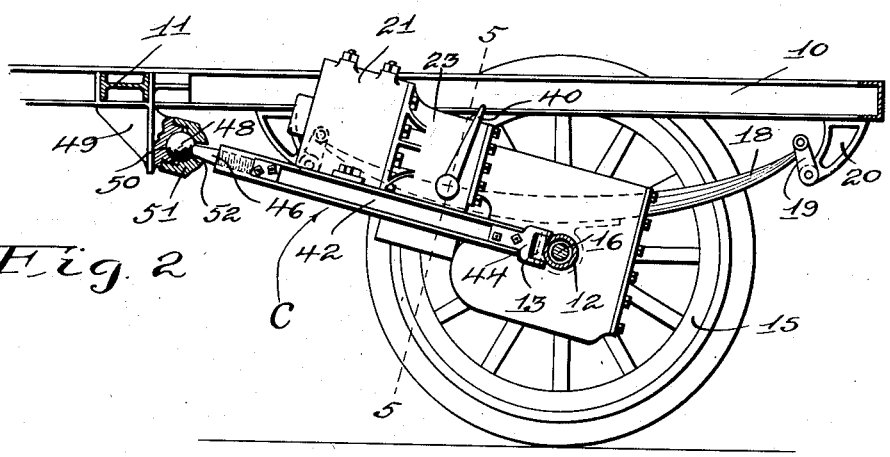

In the drawings, Figure 1 is a plan view of the rear portion of the chassis of a power-driven vehicle; Fig. 2 is a sectional view taken on the line 2—2 of Fig. 1; Fig. 3 shows a detail plan view of the motor and illustrates the transmission and differential gearing in section; Fig. 4 is a plan view showing the rear axle in detail and also illustrates in section a portion of a traction wheel, and Fig. 5 is a detail sectional view taken on the line 5—5 of Fig. 2.

Referring to the drawings, I have used the reference numeral 10 to indicate the frame of a vehicle, and 11 to designate a beam, which I secure at its ends to opposite sides of said frame 10, to form a mounting for the hereinafter described floating support C. The rear axle 12, having a perforated lug 13 near each end, is supplied with bearings 14 upon which the traction wheels 15 are mounted, and said axle contains the differential gearing A of ordinary construction and also the driving shafts 16 and 17 connecting said differential gearing and wheels. Semi-elliptic springs 18, secured to said axle, are connected at their ends through links 19, with hangers 20 upon the frame 10. The casing 21, containing the motor 22, is rigidly secured to the housing 23, which incases the change gear mechanism B, and said housing 23 is rigidly fixed to the axle 12. The motor shaft 24 extends into the housing 23 and is provided with a combination external and internal gear wheel 25 fixed thereto. The shaft 26, having the worm 27 to turn the driving gear 28 of the differential gearing A, is revolubly mounted, in alinement with the motor shaft 24, in bearings 29 on the axle 12. One end of the worm shaft 26 also extends into the housing 23 and rests in the bearing 30 contained within the gear wheel 25. Said shaft is provided with a gear wheel 31 slidable thereon and adapted to mesh with the internal teeth of the gear wheel 25. The housing 23 also contains the counter-shaft 32 upon which is slidably mounted the gear wheel 33 having teeth 34 and 35 thereon. Yokes 36 and 37, inserted respectively within the raceways 38 and 39 of the gear wheels 31 and 33, are attached to opposite ends of the lever 40. This lever is located within the housing 23 and is secured to the end of the rock-shaft 41 which is moved by the arm 40 through suitable rods and levers (not shown) to shift the gear wheels 31 and 33, whereby the gear wheels 25, 31 and 33 may be disconnected, the gear wheel 31 engaged with the internal teeth of the gear wheel 25, or the gear wheels 25 and 31 intermeshed respectively with the teeth 34 and 35 of the gear wheel 33.

The floating support C is substituted for the ordinary distance devices and torsion braces for the rear axle 12 and constitutes a base for the motor. This support consists of two I beams 42 joined in diverging relation to each other by the link 43. The rear end of each beam 42 is provided with a yoke 44 and said yoke is connected by a pin 45 with one of the lugs 13 on the axle 12. The bolt 46, threaded in the link 43 and supplied with a lock nut 47, is formed at its forward end with a ball 48. The bracket 49, centrally arranged on the beam 11, is provided with a ball socket 50 to receive the ball 48 and said ball is movably retained in said socket by the cap 51 which is threaded on said bracket and formed with a perforation 52 to loosely receive the bolt 46. The motor 21 may be of any class desired. The one illustrated, however, is an electric motor connected with a suitable source of power and controlled by mechanism not shown.

It will be noted that the floating unitary structure formed by rigidly connecting the motor, transmission, axle and support C prevents the vibration and distortion of the driving mechanism and thereby prolongs the life of the vehicle, rendering the same more efficient and minimizing the attention necessary in operating the same.

It will also be noted that the force, caused by the end thrust of the worm, which tends to turn the axle 12 and lift the support when the vehicle advances, is substantially counterbalanced by the weight of the motor, thus preventing shocks to the frame, when the vehicle is quickly started, and eliminating long strains upon the connection between the support C and the frame 10.

Having described my invention, what I claim as new and desire to protect by Letters Patent, is:

1. In a self-propelled vehicle, an axle having driving shafts therein and differential gearing connecting the same, traction wheels on said shafts, a frame supported on the axle, a floating support between said frame and axle, a worm in mesh with said differential gearing, and a motor connected with said worm for turning the same, said motor being rigidly secured to the axle and attached to said floating support between its ends to hold the axle against rotation and distribute the rotative force thereof between the frame and axle.

2. In a self-propelled vehicle, a driving mechanism including a motor provided with a casing, a transmission housing rigidly secured to said casing, an axle rigidly secured to said housing and containing driving shafts and differential gearing therefor, a worm shaft revolubly mounted within said axle and furnished with a worm gear in mesh with said differential gearing, said shaft being in alinement with the motor shaft and protruding into the housing, a bearing within said housing in which said worm shaft is revoluble, and means also within said housing for connecting the shafts to turn the same at variable speeds and for disconnecting said shafts.

3. In a self-propelled vehicle, a driving mechanism including a motor provided with a casing, a transmission housing rigidly secured to said casing, an axle rigidly secured to said housing and containing driving shafts and differential gearing therefor, a worm shaft revolubly mounted within said axle and furnished with a worm gear in mesh with said differential gearing, said shaft being in alinement with the motor shaft and protruding into the housing, a driving gear on the motor shaft, a bearing for said worm shaft supported at the center of said driving gear, a driven gear slidable on the worm shaft and means for engaging and disengaging said driving and driven gears.

4. In a self-propelled vehicle, a frame, a driving mechanism including a motor provided with a casing, a transmission housing rigidly secured to said casing, an axle rigidly secured to said housing and containing driving shafts and differential gearing therefor, a worm shaft revolubly mounted within said axle and furnished with a worm gear in mesh with said differential gearing, said shaft being in alinement with the motor shaft and protruding into the housing, a bearing within said housing in which said worm shaft is revoluble, means also within said housing for connecting the shafts to turn the same at variable speeds and for disconnecting said shafts and a floating support between said axle and frame upon which said motor is mounted.

In testimony whereof, I have signed my name to this specification in the presence of two subscribing witnesses.

HARRY RICHMOND KELLEY.

Witnesses:
F. M. HARDY,
F. C. CASWELL.